March 25, 1952     O. C. GRUENBERG     2,590,309
GUARD DEVICE FOR AXLE-EMBRACING GEAR HOUSING
Filed Jan. 18, 1950     2 SHEETS—SHEET 1
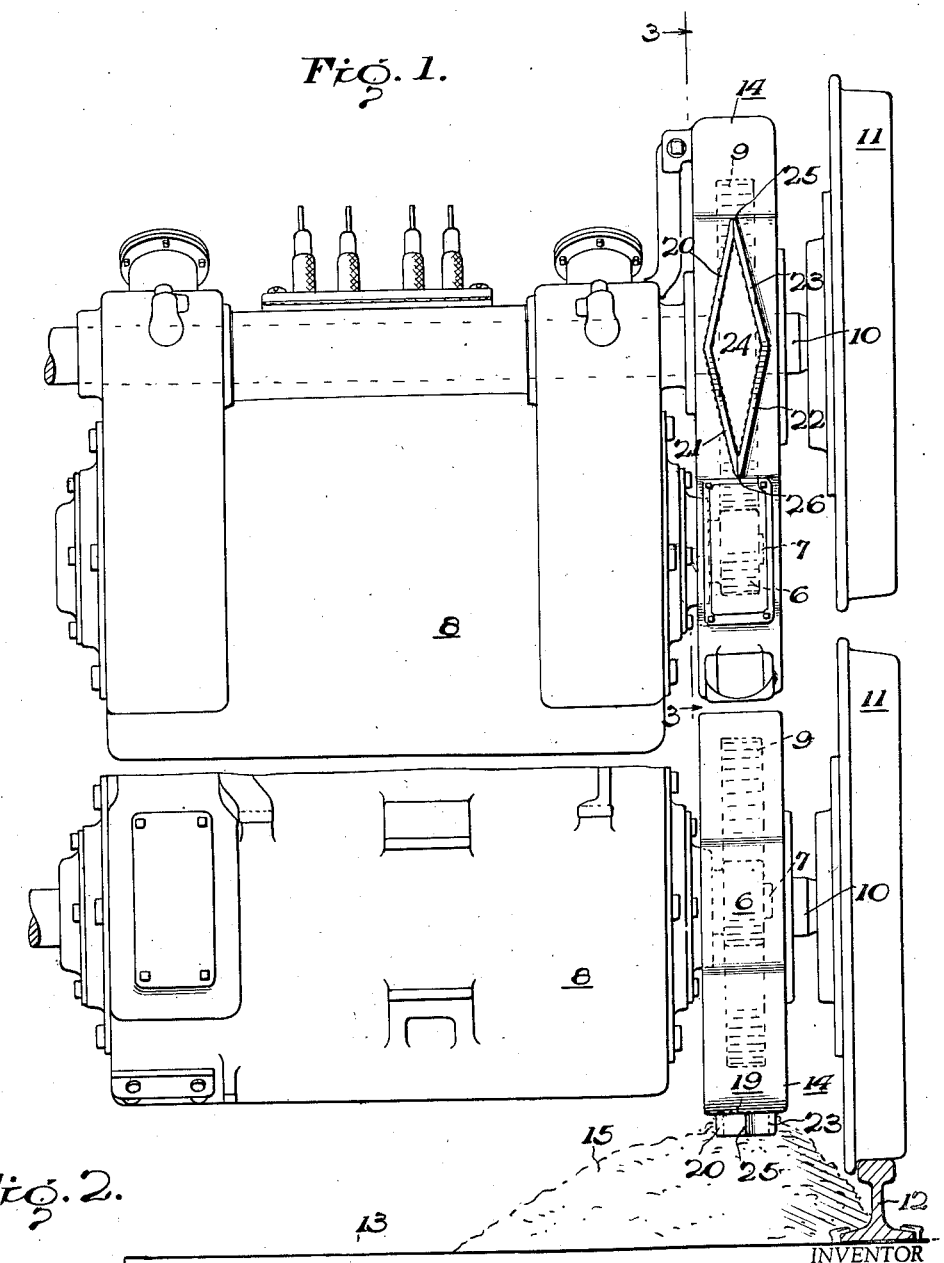
INVENTOR
Otto C. Gruenberg.
BY Martin J. Finnegan
ATTORNEY March 25, 1952 — O. C. GRUENBERG — 2,590,309
GUARD DEVICE FOR AXLE-EMBRACING GEAR HOUSING
Filed Jan. 18, 1950
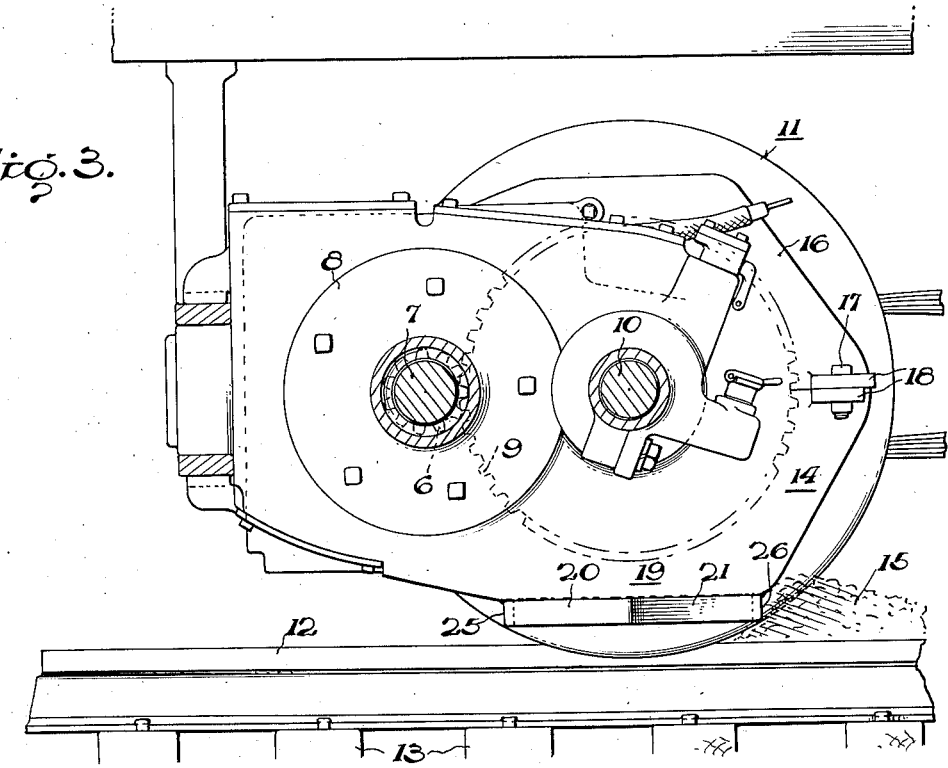
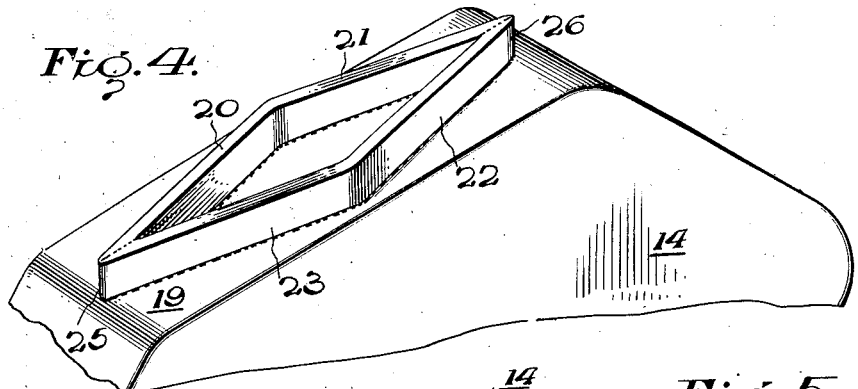
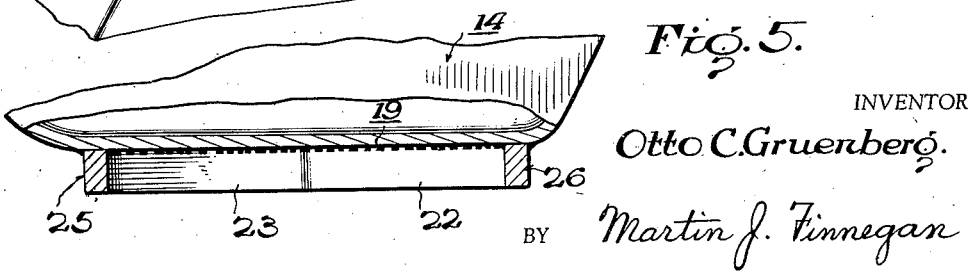
INVENTOR
Otto C. Gruenberg.
BY Martin J. Finnegan
ATTORNEY Patented Mar. 25, 1952

2,590,309

UNITED STATES PATENT OFFICE 2,590,309

GUARD DEVICE FOR AXLE-EMBRACING GEAR HOUSING

Otto C. Gruenberg, Glen Rock, N. J.

Application January 18, 1950, Serial No. 139,206

2 Claims. (Cl. 37—29)

This invention relates to railroad vehicles, and particularly to the protection of a vehicle undercarriage assembly against damage from the effects of ice, snow, ballast, or other obstruction along the railroad right of way.

Modern railroad locomotives frequently include, as part of the power plant, an under-carriage assembly containing an electric axle-driving motor whose armature shaft extends in a direction parallel to the wheel axle, and terminates in a driving pinion meshing with a larger gear, the latter being secured directly upon the wheel axle, and concentric therewith. A gear casing encloses the said pinion and gear couple, and the casing is ordinarily of two complementary sections, the upper section joining the lower section along a horizontal plane passing through the axis of the wheel axle.

Because the axle gear is necessarily of relatively large diameter, the lower section of the gear housing lies in rather close proximity to the road-bed; and when there is even a small accumulation of ice-laden snow along the space between the rails there is created a condition of interference with the free passage of the gear housing as the locomotive proceeds along a stretch of track where such a snow accumulation exists. The icy portions of the accumulation resist passage of the gear housing therethrough, and set up a reverse pressure that frequently causes a shifting of the gear housing in relation to the gears; and the ensuing jamming of parts inevitably produces a complete stoppage of power transmission, with the result that the locomotive has to be removed from service until repairs can be effected.

The present invention provides a novel construction of gear housing having inherent capacity for breaking up ice-laden snow or other accumulations in the path of the housing, and thus making it impossible for such accumulations to exert any appreciable pressure upon the gear housing, or any resistance sufficient to cause damage.

An object of the invention, therefore, is to provide an axle-embracing gear housing having inherent capacity to remove from its path any obstacle likely to cause damage thereto, or dislocation thereof.

A second object is to provide, in an axle-embracing gear housing, an ice-breaking element forming an integral part of said housing and joined thereto in such manner that there is no interruption of the surface continuity of the housing, hence no fissure that might lead to moisture infiltration.

A third object is to provide, in an axle-embracing gear housing of the character described, an ice-breaking element so constructed as to possess the same ice-breaking capabilities in a reverse direction of travel of the vehicle, as are exerted in the forward direction.

These and other objects of the invention are further explained in the following description of the preferred embodiment as illustrated in the annexed drawings, wherein:

Fig. 1 is a bottom plan view of an axle-driving assembly adapted for mounting below the floor of a railroad locomotive, and including a driving motor; a reduction gear couple consisting of a pinion and gear, the former on the motor shaft and the latter on the wheel axle; and connected housings for said motor and gear combination, the gear housing having incorporated therein the ice-breaking means of my invention;

Fig. 2 is a view in front elevation of the assembly of Fig. 1;

Fig. 3 is a transverse sectional view along the line 3—3 of Fig. 1;

Fig. 4 is a view in perspective of the bottom portion of the gear housing, showing how the ice-breaking element is integrated therewith; and Fig. 5 is a longitudinal sectional view of this same bottom portion of the gear housing, further illustrating the manner of incorporating the invention therein.

The pinion and gear combination is best shown in Figs. 2 and 3, wherein the pinion 6 is indicated as mounted directly upon the extending end portion 7 of the rotor shaft of the driving motor 8, and the gear 9—of considerably larger diameter than the pinion, for speed reducing purposes—is mounted directly upon the axle 10 which connects the two traction wheels of the locomotive, of which only the wheel 11 is illustrated. Wheel 11, of course, rolls upon the track rail 12, and it will be observed in Fig. 2 that there is relatively little space, vertically, between the upper surface 13 of the road-bed and the lower surface of the gear housing 14. A small amount of ice-laden snow, as indicated at 15, can readily become a hazard, and the means now to be described is provided to eliminate this hazard.

As illustrated best in Fig. 3, the gear housing is in two complementary sections 14, 16, each provided with a flange for joinder of one to the other along a horizontal plane passing through the center of the assembly; suitable securing bolts 17 being inserted through the mating flanges 18.

The gear housing is also bolted or otherwise secured to the main housing of the driving motor, in any desired manner.

That portion of housing section 14 which lies directly below the gear 9 is preferably (but not necessarily) flat, and horizontally disposed, as indicated best at 19 in Fig. 5; and to the outer bottom surface thereof there is appended an ice-breaking device preferably consisting of four straight strips 20, 21, 22, 23 (see Figs. 1 and 4) of high-carbon or other hard steel, each welded, bolted, cast, or otherwise integrated with the wall of the gear housing in such manner as to depend vertically downward from said wall, as shown. In the event of use of four individual strips, as suggested above by way of example, each strip will be welded to its adjacent strips at either end, at such angle thereto as to form a parallelogram having two opposite acute angles and two opposite obtuse angles (see Fig. 4), with the vertices of acute angles in alignment along a line parallel to the lines of the rails upon which the vehicle travels.

Again, as above indicated, a bolting or other mechanical fastening, inter-fitting, or inter-locking arrangement (including integral casting) may be employed, in lieu of welding to obtain the desired final result of a parallelogram having its sides joined to present the indicated inter-relationship, and to achieve the indicated purpose.

The use of straight, relatively thin strips automatically provides a hollow space, or clearance, 24, within the parallelogram, and this clearance is highly beneficial in that it facilitates disposal of the ice and snow from the vicinity of the ice-engaging edge 25 (or 26) of the parallelogram. This edge 25 (or 26, when the locomotive is traveling in reverse direction) will act as a cleaving blade to disperse all ice-laden snow or similar obstructions in its path, and thus prevent the development of any upwardly directed pressure upon the gear housing.

In referring to the housing 14, 16 as a gear housing, it is to be understood that this expression includes any housing employed in the indicated position and relationship to the driving axle of a railway locomotive, and irrespective of whether the torque transmitting mechanism enclosed by such housing is of the purely mechanical speed reducing character illustrated, or of some different mechanical, hydraulic, electro-mechanical or other equivalent character, as, for example, one of the now commonly employed hydraulic converting units, or any other units of mechanical, hydraulic, or electrical composition, or any combination thereof.

The depending device may have shapes other than that of a true parallelogram; the important point being that acute angles are formed at the points of engagement with the ice or other obstruction.

What I claim is:

1. A protective guard device for integral mounting on a railway vehicle power plant of the axle-embracing type wherein the vehicle propelling motor and the gear train connecting said motor with the vehicle axle are suspended beneath the floor of the vehicle, in a housing which surrounds said axle, which housing has its lowest section disposed below said axle and closely adjacent to one of the wheels of the vehicle, said protective guard device comprising a plurality of blade-like strips of metal integrally secured to the gear train housing wall and depending vertically downward from the lowest portion of said housing to a level approximating the level of the lowest point on the vehicle's wheel assembly, said blade-like strips being positioned with their forward edges joined to form an acute-angled cutting instrument adapted to exert cleaving pressure upon ice-laden snow or other obstruction in the path it traverses.

2. A protective guard device as defined in claim 1, wherein said blade-like strips are disposed in two pairs, with one pair joined to the other to form a parallelogram having acute-angled edges pointing forwardly and rearwardly, respectively, and aligned with the direction of travel of the vehicle.

OTTO C. GRUENBERG.

REFERENCES CITED

The following references are of record in the file of this patent:

UNITED STATES PATENTS

| Number | Name | Date |
|---|---|---|
| 1,124,226 | Hodgson | Jan. 5, 1915 |
| 1,804,193 | Winther | May 5, 1931 |
| 2,355,204 | Couse | Aug. 8, 1944 |